US008677452B2

(12) United States Patent
Inbaraj et al.

(10) Patent No.: US 8,677,452 B2
(45) Date of Patent: Mar. 18, 2014

(54) SYSTEM AND METHOD FOR REMOTE MANAGEMENT OF A PLURALITY OF TARGET COMPUTERS FROM A COMMON GRAPHICAL INTERFACE

(75) Inventors: Joseprabu Inbaraj, Suwanee, GA (US); Chittaraiah Pabba, Cumming, GA (US)

(73) Assignee: American Megatrends, Inc., Norcross, GA (US)

( * ) Notice: Subject to any disclaimer, the term of this patent is extended or adjusted under 35 U.S.C. 154(b) by 65 days.

(21) Appl. No.: 13/306,718

(22) Filed: Nov. 29, 2011

(65) Prior Publication Data

US 2013/0139234 A1 May 30, 2013

(51) Int. Cl.
*G06F 7/04* (2006.01)
*G06F 17/30* (2006.01)

(52) U.S. Cl.
USPC ............................................................ 726/2

(58) Field of Classification Search
USPC ...................... 726/2, 6–8; 713/153, 155, 168
See application file for complete search history.

(56) References Cited

U.S. PATENT DOCUMENTS

| 7,930,388 B2* | 4/2011 | Zhang et al. ................... 709/224 |
| 2004/0019897 A1* | 1/2004 | Taylor et al. ................... 719/330 |
| 2009/0019535 A1* | 1/2009 | Mishra et al. ................... 726/12 |
| 2009/0055157 A1* | 2/2009 | Soffer .............................. 703/27 |
| 2011/0276625 A1* | 11/2011 | Shah ............................. 709/203 |

OTHER PUBLICATIONS

Remote Management of x64 Servers Using the Sun ILOM Remote Console, http://docs.oracle.com/cd/E19203-01/820-1188-12/core_ilom_remoteconsole.html, Sun Microsystems, 2008.*

* cited by examiner

*Primary Examiner* — Ali Abyaneh
*Assistant Examiner* — Jing Sims
(74) *Attorney, Agent, or Firm* — Morris Manning & Martin, LLP; Tim Tingkang Xia, Esq.

(57) ABSTRACT

A computer system. In one embodiment, the computer system includes a remote management computer with a user input device and a display device, a plurality of target computers communicatively connected to the remote management computer over a communications link, and a computer-executable remote management application. Each target computer includes a baseboard management controller (BMC) executing a keyboard, video, and mouse (KVM) redirection application and storing remote management data. The remote management application causes the remote management computer to perform functions that include receiving user authentication data for a user to remotely access particular target computers, sending a request for remote management data to each of the particular target computers, receiving remote management data from each of the particular target computers in response to the request, and causing the display device to simultaneously display the graphical user console for each one of the particular target computers in a common graphical interface.

12 Claims, 6 Drawing Sheets

SYSTEM AND METHOD FOR REMOTE MANAGEMENT OF A PLURALITY OF TARGET COMPUTERS FROM A COMMON GRAPHICAL INTERFACE

FIELD OF THE INVENTION

The present invention generally relates to remote management of target computers, and more particularly to remote management of a plurality of target computers using a common graphical interface displayed on a remote management computer.

BACKGROUND OF THE INVENTION

A remote user such as a network administrator can be responsible for managing the operations of up to hundreds of individual server computers in a datacenter. Conventionally, to view and manage all of the servers, the administrator is required to launch a server management remote keyboard, video and mouse (KVM) session for each individual server. This may require the administrator to authenticate individually to hundreds of KVM redirection applications.

Therefore, heretofore unaddressed needs still exist in the art to address the aforementioned deficiencies and inadequacies.

SUMMARY OF THE INVENTION

By practicing one or more aspects of the present invention disclosed herein in various exemplary embodiments, a system, method, and computer-readable storage medium are provided for a remote user to view and manage multiple server management remote KVM sessions from a single user interface displayed on a common remote management console. The framework provides for the user to view and manage the KVM redirection applications for all of the servers from a single window. Further, shared authentication is provided such that the remote user does not have to authenticate each server individually, by using IPMI credentials from integrated web applications for managing the multiple sessions.

In one aspect, the present invention relates to a computer system. In one embodiment, the computer system includes a remote management computer having a user input means and a display means; a plurality of target computers are communicatively coupled to the remote management computer over a communications link; and, a computer-executable remote management application is configured to, when executed by one or more processors, cause the remote management computer to perform specific functions. The specific functions performed include receiving, via the user input means, user authentication data having login information configured for permitting a user of the remote management computer to remotely access particular target computers of the plurality of target computers, over the communications link; sending a request for remote management data to each of the particular target computers over the communications link; in response to the request, receiving remote management data from each of the particular target computers over the communications link; and, based on the received remote management data, causing the display means to simultaneously display at least one visual representation of the graphical user console for each one of the particular target computers in a common graphical interface.

In one embodiment, the one or more visual representations of the graphical user console for each of the particular target computers include an interactive display window.

In one embodiment, the one or more visual representations of the graphical user console for each of the particular target computers are generated based on keyboard, video, and mouse (KVM) redirection from the corresponding particular target computer to the remote management computer.

In one embodiment, the login information is shared across the plurality of particular target computers to authenticate the user for a KVM session for each of the particular target computers. Sharing the login information includes providing corresponding IPMI credentials from integrated web applications.

In one embodiment, the functions of receiving user authentication data and causing the display means to simultaneously display the visual representations are performed via a web-based application executing on the remote management computer.

In one embodiment, the remote management data for each of the particular target computers includes computer-executable instructions which, when executed by one or more processors, provide at least one remote management functionality to the remote management computer for remotely managing at least one operation of the corresponding particular target computer. The remote management data, as received, is provided within a single aggregate file and, more particularly a Java Archive (JAR) file. The function of receiving the remote management data includes downloading the JAR file from the corresponding particular target computer over the communications link. The function of causing the display means of the remote management computer to simultaneously display at least one visual representation of the graphical user console for each one of the particular target computers on a common graphical interface includes invoking the downloaded aggregate file corresponding to each one of the particular target computers.

In another aspect, the present invention relates to a computer-implementable method. In one embodiment, the method includes the steps of: receiving, from a user of a remote management computer, user authentication data having login information configured for permitting the user to remotely access particular target computers over a communications link; sending a request for remote management data to each of the plurality of particular target computers over the communications link; in response to the request, receiving remote management data from each of the particular target computers over the communications link; and, based on the received remote management data, causing a display means of the remote management computer to simultaneously display at least one visual representation of the graphical user console for each one of the particular target computers in a common graphical interface.

In one embodiment, the one or more visual representations of the graphical user console for each of the particular target computers include an interactive display window for each of the particular target computers that is generated based on keyboard, video, and mouse (KVM) redirection from the corresponding particular target computer to the remote management computer.

In one embodiment, the login information is shared across the plurality of particular target computers to authenticate the user for a KVM session for each of the particular target computers. Sharing the login information includes providing corresponding IPMI credentials from integrated web applications.

In one embodiment, the steps of receiving user authentication data and causing the display means to simultaneously display the visual representations are performed via a web-based application executing on the remote management computer.

In one embodiment, the remote management data for each of the particular target computers includes computer-executable instructions which, when executed by one or more processors, provide at least one remote management functionality to the remote management computer for remotely managing at least one operation of the corresponding particular target computer. The remote management data, as received, is provided within a single aggregate file and, more particularly, a Java Archive (JAR) file.

In one embodiment, the step of receiving the remote management data includes downloading the aggregate file from the corresponding particular target computer over the communications link. The step of causing the display means of the remote management computer to simultaneously display at least one visual representation of the graphical user console for each one of the particular target computers on a common graphical interface includes invoking the downloaded aggregate file corresponding to each one of the particular target computers.

In yet another aspect, the present invention relates to a computer-readable medium having stored instructions which, when executed by one or more processors, cause a computer system to perform specific functions. In one embodiment, the functions include: receiving user authentication data having login information configured for permitting a user of a remote management computer to remotely access particular target computers over a communications link; sending a request for remote management data to each of the particular target computers over the communications link; in response to the request, receiving remote management data from each of the particular target computers over the communications link; and, based on the received remote management data, causing a display means of the remote management computer to simultaneously display at least one visual representation of the graphical user console for each one of the particular target computers in a common graphical interface.

In one embodiment, the one or more visual representations of the graphical user console for each of the particular target computers include an interactive display window and are generated based on keyboard, video, and mouse (KVM) redirection from the corresponding particular target computer to the remote management computer.

In one embodiment, the login information is shared across the plurality of particular target computers to authenticate the user for a KVM session for each of the particular target computers. Sharing the login information includes providing corresponding IPMI credentials from integrated web applications.

In one embodiment, the functions of receiving user authentication data and causing the display means to simultaneously display the visual representations are performed via a web-based application executing on the remote management computer.

In one embodiment, the remote management data for each of the particular target computers includes computer-executable instructions which, when executed by one or more processors, provide at least one remote management functionality to the remote management computer for remotely managing at least one operation of the corresponding particular target computer. The remote management data, as received, is provided within a single aggregate file.

In one embodiment, the aggregate file is configured as a Java Archive (JAR) file.

In one embodiment, the function of receiving the remote management data includes downloading the aggregate file from the corresponding particular target computer over the communications link.

In one embodiment, the function of causing the display means of the remote management computer to simultaneously display at least one visual representation of the graphical user console for each one of the particular target computers on a common graphical display includes invoking the downloaded aggregate file corresponding to each one of the particular target computers.

These and other aspects of the present invention will become apparent from the following description of the preferred embodiments taken in conjunction with the following drawings, although variations and modifications thereof may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 3 schematically shows a common graphical interface with visual representations of graphical user consoles for two different remote servers, wherein

DETAILED DESCRIPTION OF THE INVENTION

Figure 1:
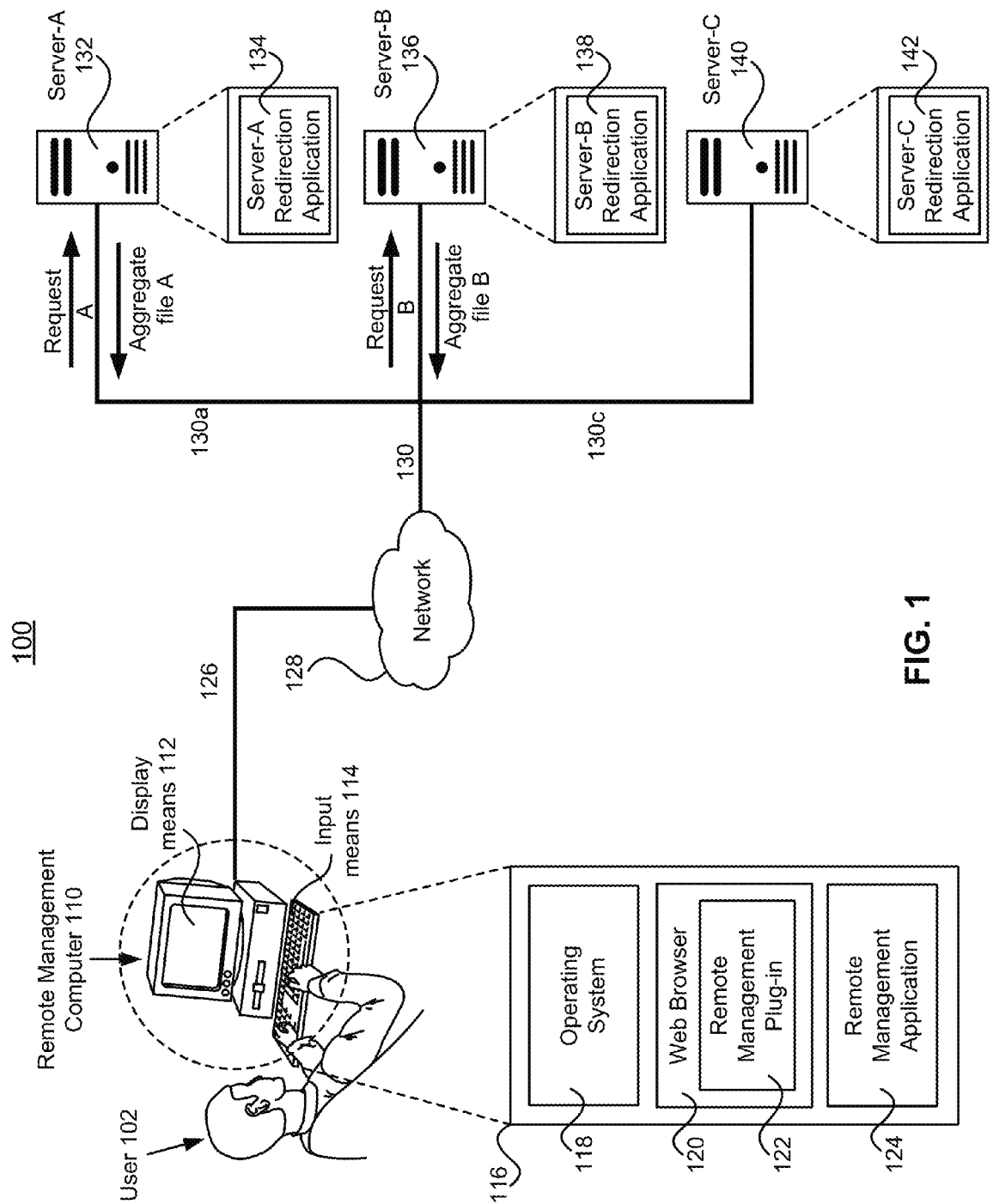
FIG. 1 schematically shows a computer system for remote management of a plurality of target computers using a common graphical interface, according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. The description will be made as to the embodiments in conjunction with the accompanying drawings in FIGS. 1-5.

FIG. 1 schematically shows a computer system for remote management of a plurality of target computers using a common graphical interface, according to one embodiment of the present invention. As shown, the computer system includes a remote management console computer 110 with a user input means 114 and a display means 112. Target server computers 132, 136, 140 are communicatively coupled to the remote management computer 110 over a communications link 126, 128, 130(*a-c*). A computer-executable remote management application 124 is configured to, when executed by one or more processors, cause the remote management computer 110 to perform functions that include receiving, via the user input means 114, user authentication data that includes login information such as a username and password for permitting a user 102 of the remote management computer 110 to remotely access particular target computers 132, 136 of the target computers 132, 136, 140 over the communications link 126, 128, 130(*a-c*). The remote management application 124 is also executable to cause the remote management computer 110 to send a request (see "request A", "request B") for remote management data to each of the particular target computers 132, 136 over the communications link 126, 128, 130 (*a-c*). Further, the remote management application 124 is executable to cause the remote management computer 110 to, in response to the requests, receive remote management data from each of the particular target computers 132, 136 over the communications link 126, 128, 130(*a-c*), where the remote management data is provided or not provided to the remote management computer based on predetermined specific access credentials associated with the login information that the particular user 102 of the remote management computer 110 entered, which may allow the user 102 to only access and manage particular computers but not all of the plurality of communicatively coupled server computers. In the embodiment shown in FIG. 1, the user 102 is permitted to access and manage server computers 132 and 136, but not server computer 140, and thus the target computers 132 and 136 are referred to as "particular" target computers. The remote management application 124 is also executable to cause the remote management computer 110 to, based on the received remote management data, cause the display means 112 to simultaneously display at least one visual representation of the graphical user console for each one of the particular target computers 132, 136 in a common graphical interface.

The visual representations of the graphical user console for the particular target computers 132, 136 include respective interactive display windows and are generated based on KVM redirection via server redirection applications 134 and 138 (see "Server-A redirection application" and "Server-B redirection application", respectively) from the corresponding particular target computer 132, 136 to the remote management computer 110. Various KVM redirection protocols can be accommodated by delegating the protocol specifics to individual KVM solution implementation units. The functions of receiving user authentication data and causing the display means 112 to simultaneously display the visual representations are performed via a web-based application 120, 122, 124 executing on the remote management computer 110. The common framework provided according to one or more embodiments of the present invention disclosed herein can be operated as a Java applet configured to permit third party KVM implementations to integrate various disclosed aspects into third-party type web interfaces.

The remote management data for the particular target computers 132, 136 includes computer-executable instructions which, when executed by one or more processors, provide at least one remote management functionality to the remote management computer 110 for remotely managing at least one operation of the corresponding particular target computer 132, 136.

Those skilled in the art will recognize that remote management applications can utilize remote management IPMI user credentials after discovering and authenticating a remote computer. By practicing one or more aspects of the present invention disclosed herein in various exemplary embodiments, by using IPMI credentials corresponding to the user login information, from integrated web applications, multiple KVM sessions can be managed through shared authentication such that the user does not have to authenticate each target server computer individually. According to one or more embodiments, to disseminate the shared login information to each one of the sessions and integrate them, KVM launch protocol is used, with XML requests and responses to obtain IPMI user credentials from a remote management application. The common console display then establishes a web session to the remote computer, with the provided IPMI user credentials, and then JNLP files and JAR files are downloaded to launch the KVM sessions and view the remote computer video.

The remote management data for the two particular target computers 132, 136, as received, is provided within corresponding individual aggregate files ("aggregate file A", "aggregate file B"). More particularly, each of the individual aggregate files, as received, is configured as a Java Archive (JAR) file. The function of receiving the remote management data includes downloading the aggregate files from the corresponding particular target computers 132, 136 over the communications link 126, 128, 130(*a-c*). The function of causing the display means 112 of the remote management computer 110 to simultaneously display at least one visual representation of the graphical user console for each one of the particular target computers 132, 136 on a common graphical interface includes invoking the downloaded aggregate file corresponding to each one of the particular target computers 132, 136.

Figure 2:
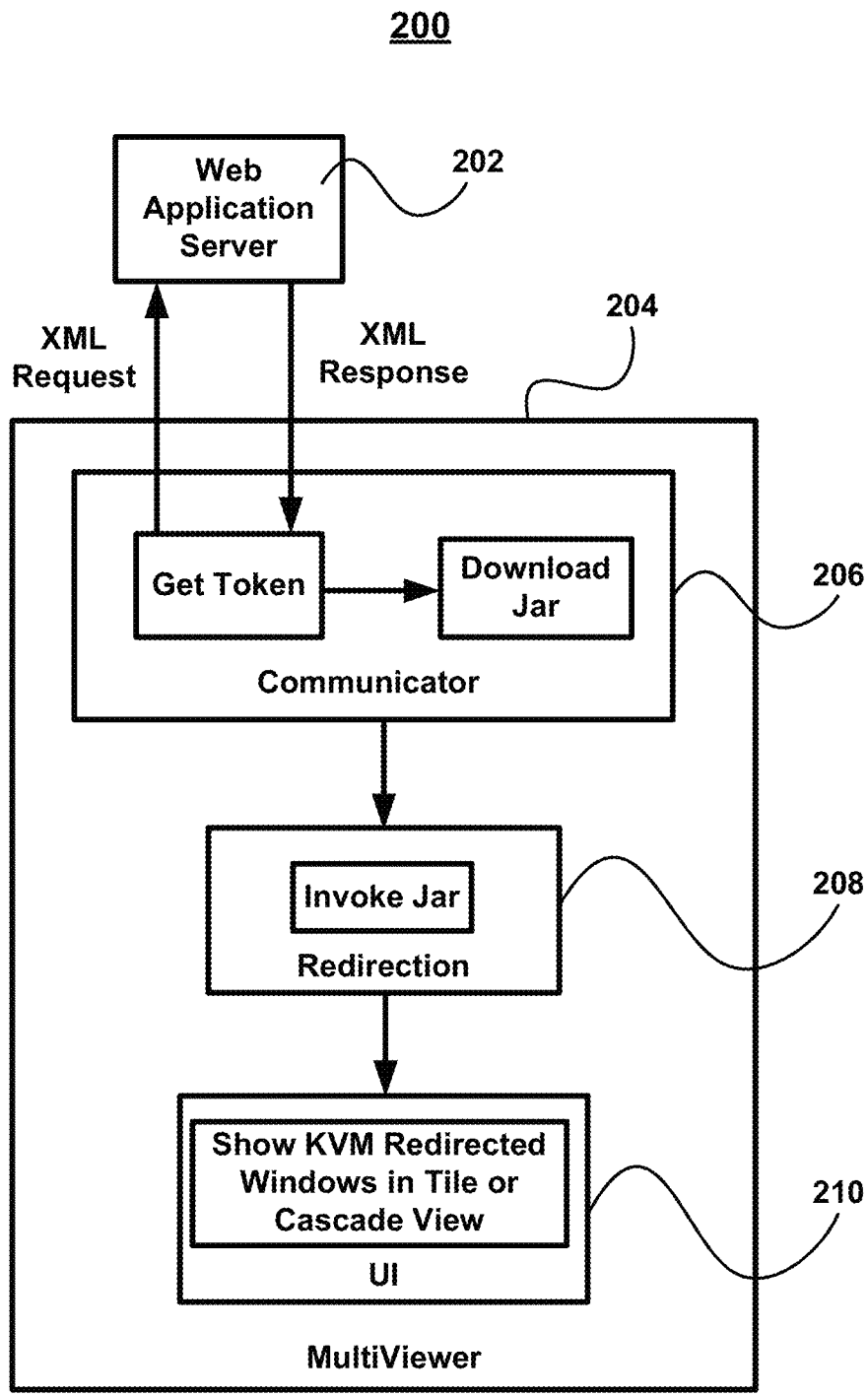
FIG. 2 schematically shows a functional architecture for remote management of a plurality of target computers using a common graphical interface, according to one embodiment of the present invention.

FIG. 2 schematically shows a functional architecture for a computer system implementing a method for remote management of a plurality of target computers using a common graphical interface, according to one embodiment of the present invention. As shown, a web application server computer 202 is communicatively coupled to a management application which provides a common graphical interface, designated in FIG. 2 as a "MultiViewer" 204. The web application server 202 and a communicator module 206 of the MultiViewer 204 are operative to communicate XML requests and responses. Particularly, the communicator module 206 is operative to provide for authentication of a user of a remote management computer executing the MultiViewer 204, with each one of a plurality of server computers to be remotely managed, through the exchange of a corresponding secure token. The communicator module 206 is further operative to download a JAR file for each corresponding one of the server computers. A redirection module 208 that is operatively coupled to the communicator module 206 is operative to invoke the downloaded JAR file to provide KVM redirection of the graphical user console for each respective one of the managed server computers. The redirection function provided by the redirection module 208 provides for an operatively coupled user interface module ("UI") 210 to provide a KVM redirected console window for each corresponding one of the managed server computers, in a common graphical interface displayed to a user of the remote management computer on a display means.

KVM JAR files are invoked when a user desires to launch a KVM session to view remote computer video of a respective one of the particular target computers. The KVM JAR files are downloaded from the particular corresponding target computers to invoke the JAR files for every one of the respective KVM sessions, and it is not required that the JAR files reside on any single server computer or other particular target computer.

Figure 3A:
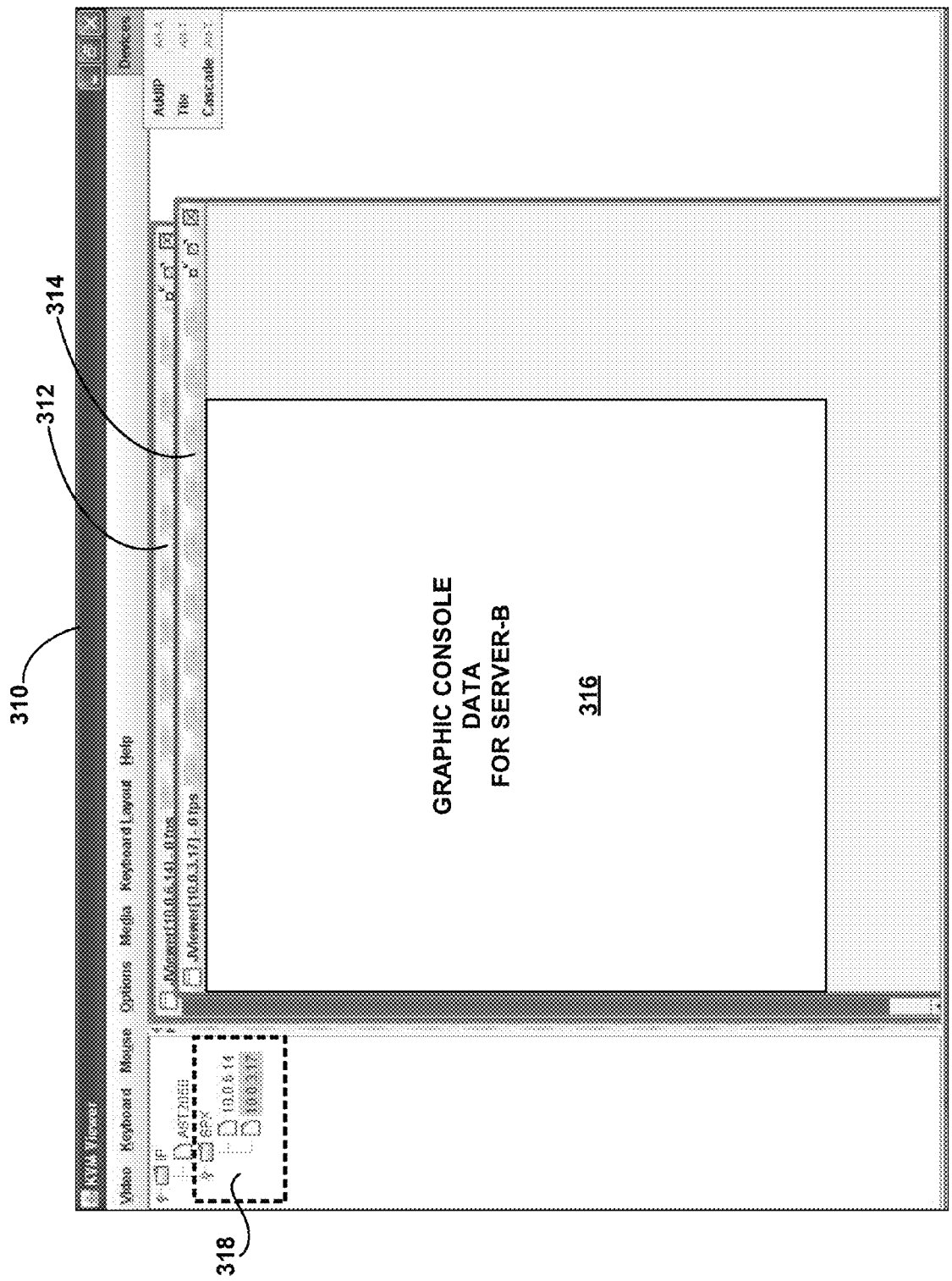
FIG. 3A shows two corresponding display windows in a cascaded arrangement.
Figure 3B:
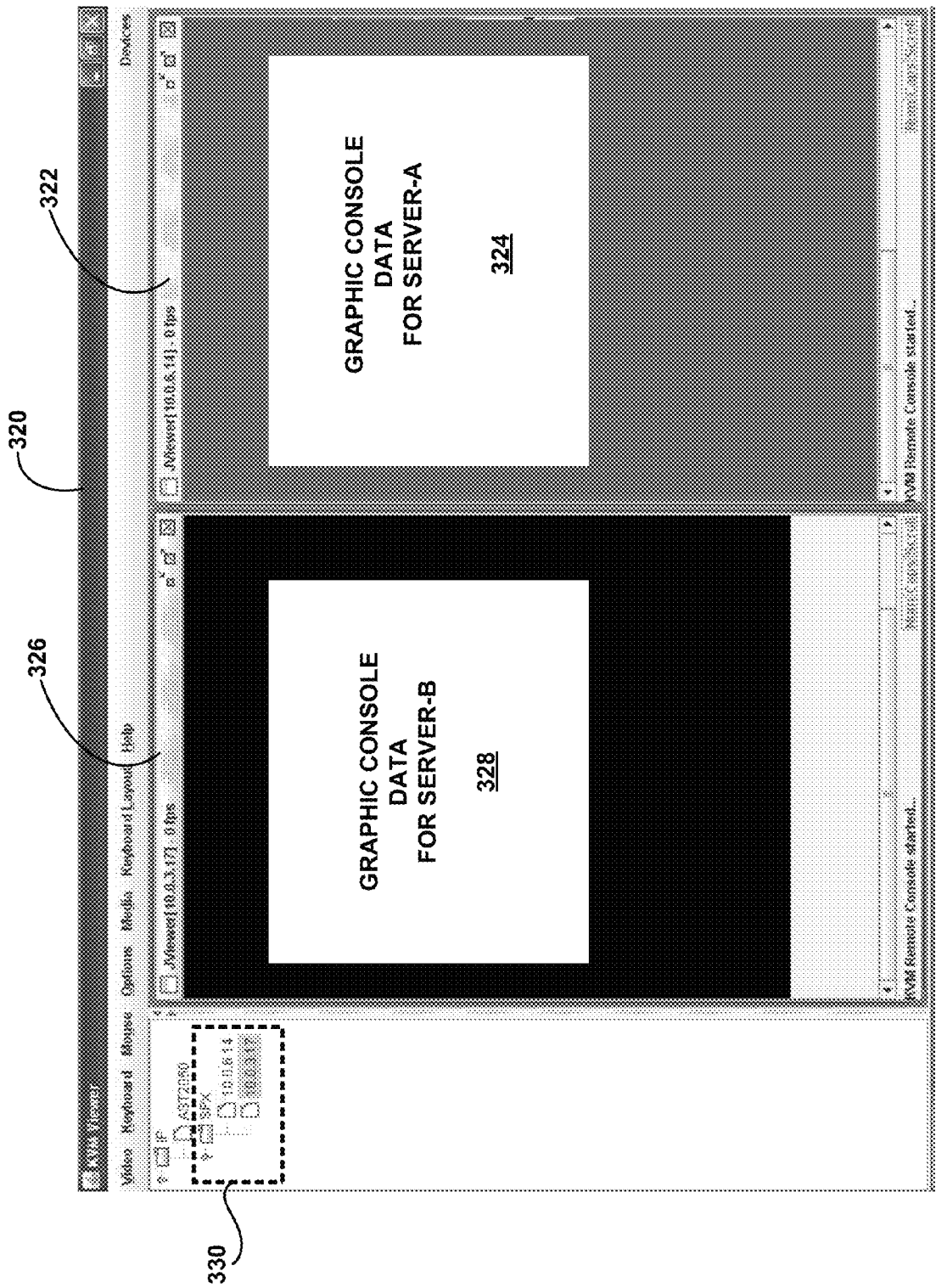
FIG. 3B shows two corresponding display windows in a side-by-side arrangement, according to various embodiments of the present invention.

FIG. 3 schematically shows a common graphical interface with visual representations of graphical user consoles for two managed server computers. FIG. 3A shows two corresponding display windows in a cascaded arrangement, and FIG. 3B shows two corresponding display windows in a side-by-side arrangement. In FIG. 3A, display window 314 corresponds to KVM redirection of the graphical user console with graphical console data 316 for a first server, Server-B. This window 314 corresponds to a session with the managed server identified with IP address 10.0.3.17 (see displayed list 318 of discovered and accessed target computers). Display window 312 corresponds to KVM redirection of the graphical user console for a second server with IP address 10.0.6.14. As shown, the two display windows 312 and 314 are provided in a common graphical interface 310. In FIG. 3B, a common graphical interface 320 includes a first display window 322 with graphical console data 324 corresponding to KVM redirection of the graphical user console for a first server, Server-A, which has IP address 10.0.3.17, and a second display window 326 with graphical console data 328 corresponding to a second server, Server-B, which has IP address 10.0.6.14 (see list 330 of discovered and accessed target computers 330).

Figure 4:
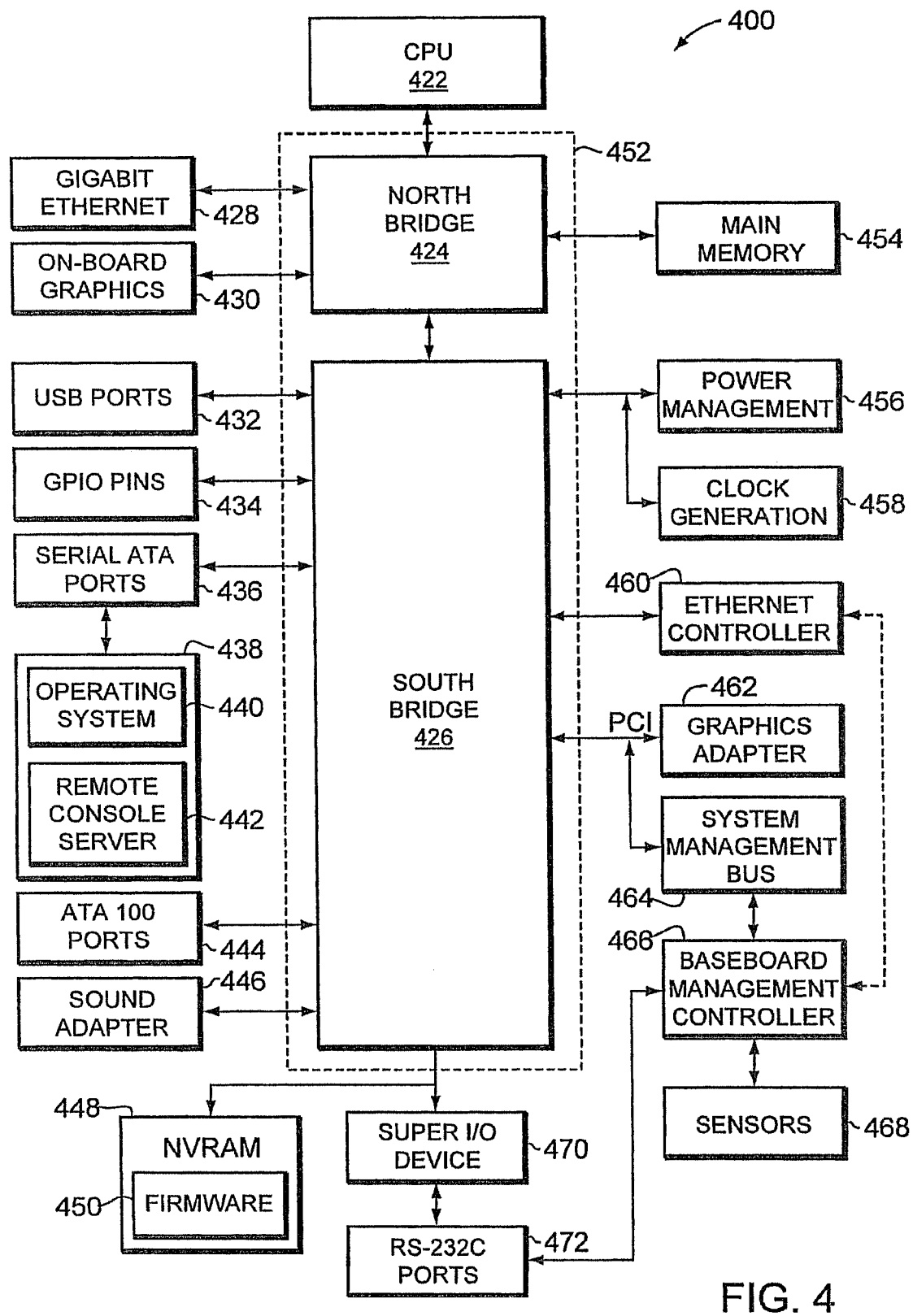
FIG. 4 schematically shows computer architecture for various computing systems utilized according to one or more embodiments of the present invention.

Now referring specifically to FIG. 4, computer architecture of an exemplary computing system is shown, which may be utilized according to one or more embodiments of the present invention. The remote management console computer 110 and/or target server computers 132, 136, and 140 shown in FIG. 1 may utilize some or all of the computing components illustrated and described with reference to FIG. 4. The architecture shown in FIG. 4 corresponds to a computer 400 having a baseboard, or "motherboard," which is a printed circuit board to which components or devices may be connected by way of a system bus or other electric communication path. In one embodiment, a central processing unit (CPU) 422 operates in conjunction with a chipset 452. The CPU 422 is a standard central processor that performs arithmetic and logical operations necessary for the operation of the computer 400. It should be appreciated that the computer 400 may include additional processors to work in conjunction with the CPU 422.

The chipset 452 includes a north bridge 424 and a south bridge 426, where the north bridge 424 provides an interface between the CPU 422 and the remainder of the computer 400. The north bridge 424 also provides an interface to a random access memory (RAM) used as the main memory 454 in the computer 400 and, optionally, to an onboard graphics adapter 430. The north bridge 424 may also include functionality for providing networking functions through a network adapter 428, shown in FIG. 4 as an Ethernet adapter. The network adapter 428 is operative to connect the computer 400 to one or more other computers via network connections. Connections which may be made by the network adapter 428 include local area network (LAN), wireless local area network (WLAN), or wide area network (WAN) connections. Those skilled in the art will recognize that LAN, WLAN, and WAN networking environments are commonplace in offices, enterprise-wide computer networks, intranets, and internet-based network architecture. As shown, the north bridge 424 is connected to the south bridge 426.

The south bridge 426 is operative to control input/output functions of the computer 400. In particular, the south bridge 426 may provide one or more universal serial bus (USB) ports 432, a sound adapter 446, a network controller 460 shown as an Ethernet controller, and one or more general purpose input/output (GPIO) pins 434. The south bridge 426 may also provide a bus for interfacing peripheral card devices such as a graphics adapter 462. In one embodiment, the bus comprises a peripheral component interconnect (PCI) bus. The south bridge 426 may also provide a system management bus 464 for use in managing the various components of the computer 400, and a power management module 456.

The south bridge 426 is also operative to provide one or more interfaces for connecting mass storage devices to the computer 400. For instance, according to an embodiment, the south bridge 426 includes a serial advanced technology attachment (SATA) adapter for providing one or more serial ATA ports 436 and an ATA-100 adapter for providing one or more ATA-100 ports 444. The serial ATA ports 436 and ATA-100 ports 444 may be, in turn, connected to one or more mass storage devices, such as a SATA disk drive 438 storing an operating system 440 and application programs. Those skilled in the art will recognize that an operating system 440 has a set of programs that control operations of a computer and allocation of resources. An application program is software that runs on top of the operating system software, or other runtime environment, and uses computer resources to perform application-specific tasks desired by the user. A remote console server application 442 is stored on the drive 438 and executed by the computer 400 to redirect the text or graphical display of the computer 400 once the operating system and remote console server application 442 have been loaded.

According to one embodiment, the operating system 440 corresponds to a WINDOWS® operating system and the remote console server application 442 includes a remote desktop application compatible with remote desktop protocol (RDP). According to an alternative embodiment, the operating system 440 corresponds to a LINUX® operating system and the remote console server 442 includes a server that is compatible with the SDP protocol for providing a redirect text display. It should be appreciated that other types of remote desktop servers that are compatible with other types of remote desktop protocols may also be utilized.

Mass storage devices connected to the south bridge 426, and their associated computer-readable media, provide non-volatile storage for the computer 400. Although the description of computer-readable media contained herein refers to a mass storage device such as a hard disk drive, those skilled in the art will recognize that computer-readable media can be any available media that can be accessed by the computer 400. Computer-readable media may include computer storage media and communication media. Computer storage media includes volatile and non-volatile, removable and non-removable media implemented in any method or technology for storage of information such as computer-readable instructions, data structures, program modules or other data. Computer storage media includes RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 400.

A low pin count ("LPC") interface may also be provided by the south bridge for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that are operative to start up the computer 400 and to transfer information between elements within the computer 400. It should be appreciated that during execution of BIOS and POST portions of the firmware 450, text screen displays of the computer 400 may be provided via serial ports or a network controller using serial-over-LAN protocol.

The south bridge 426 may include a system management bus 464. The system management bus 464 may be operatively associated with a baseboard management controller (BMC) 466. In general, the BMC 466 is a microcontroller that monitors operation of the computer system 400. In a more specific embodiment, the BMC 466 monitors health-related aspects associated with the computer system 400, such as the temperature of one or more components of the computer system 400, speed of rotational components (e.g. spindle motor, CPU fan, etc.) within the system, the voltage across or applied to one or more components within the system 400, and the available or used capacity of memory devices within the system 400. To accomplish these monitoring functions, the BMC 466 is communicatively connected to one or more components by way of the management bus 464. In one exemplary embodiment, these components include sensor devices for measuring various operating and performance-related parameters within the computer system 400. It should be appreciated that the management bus 464 may include components other than those explicitly shown in FIG. 4. In one embodiment, the management bus 464 is an I2C bus. It should be appreciated that several physical interfaces exist for communicating with the BMC 466 in addition to the management bus 464. Serial ports and a network controller may be utilized to establish a connection with the BMC 466.

The management bus 464 is used by the BMC 466 to request and/or receive various operating and performance-related parameters from one or more components, which are also communicatively connected to the management bus 464. For instance, in one embodiment, the management bus 464 communicatively connects the BMC 466 to a CPU temperature sensor and a CPU fan (not shown in FIG. 4), thereby providing a means for the BMC 466 to monitor and/or control operation of these components. The BMC 466 may be directly connected to sensors 468. The serial ports 472 and the Ethernet controller 460 may be utilized to establish a connection with the BMC 466.

According to one embodiment, firmware of the BMC 466 adheres to the Intelligent Platform Management Interface (IPMI) industry standard for system monitoring and event recovery. The IPMI specification provides a common message-based interface for accessing all of the manageable features in the computer 400. IPMI includes a set of predefined commands for reading temperature, voltage, fan speed, chassis intrusion and other parameters. System event logs, hardware watchdogs, and power control can also be accessed through IPMI. In this manner, IPMI defines protocols for accessing the various parameters collected by the BMC 466 through the operating system 440 or through an external connection, such as through a network or serial connection.

It should be appreciated that although the computer 400 shown in the embodiment of FIG. 4 is described in the context of a server computer or remote management computer, other types of computer system configurations may be used, such as multiprocessor systems, minicomputers, or personal desktop or laptop computers. It is also contemplated that the computer 400 may not include all of the components shown in FIG. 4 and/or may include other components that are not explicitly shown in FIG. 4.

Figure 5:
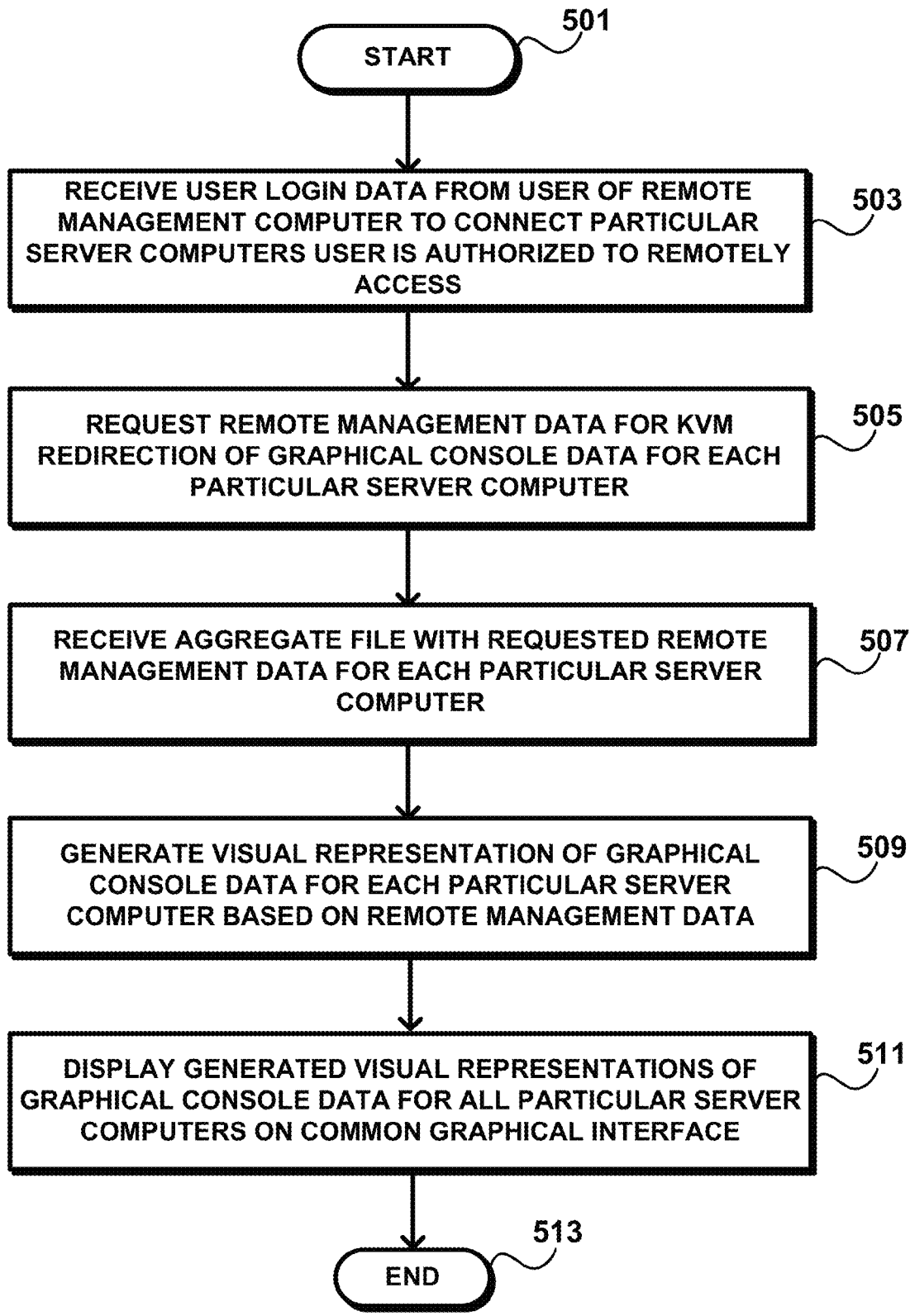
FIG. 5 is a flow chart illustrating operational steps of a computer-implementable method for remote management of a plurality of target computers using a common graphical interface, according to one embodiment of the invention.

FIG. 5 is a flow chart illustrating operational steps of a computer-implementable method for remote management of a plurality of target computers using a common graphical interface, according to one embodiment of the invention.

It should be appreciated that operational steps of the method may be performed by one or more processors associated with the remote management computer and/or one or more of the target server computers of the computer system shown in and described with reference to the embodiment of FIG. 1, according to computer-executable instructions that may be stored on a non-transitory computer-readable medium associated with the remote management computer and/or one or more of the target server computers, to cause the remote management computer and target computers to perform the corresponding specific functions according to the steps of the method.

As shown, the method 500 begins at step 501 and includes the step 503 of receiving user login data from a user of a remote management computer to connect particular target server computers that the user is authorized to remotely access. Next, at step 505 a request is made for remote management data for providing KVM redirection of graphical console data for each one of the particular server computers. After step 505, at step 507 an aggregate file is received as the remote management data, for each one of the particular server computers. Following step 507, a visual representation of graphical console data for each of the particular server computers is generated based on the received remote management data, at step 509. Next, at step 511 the generated visual representations of graphical console data for all of the particular server computers is displayed on a single common graphical interface, and then the method ends at step 513.

Now referring to again to FIGS. 1-5, in one aspect, the present invention relates to a computer system. In one embodiment, the computer system includes: a remote management computer 110 having a user input means 114 and a display means 112; a plurality of target computers 132, 136, 140 communicatively coupled to the remote management computer 110 over a communications link 126, 128, 130(*a-c*); and a computer-executable remote management application 124 configured to, when executed by one or more processors (see, for example, CPU 422), cause the remote management computer 110 to perform specific functions. The functions include: receiving, via the user input means 114, user authentication data including login information configured for permitting a user 102 of the remote management computer 110 to remotely access particular target computers 132, 136 of the plurality of target computers 132, 136, 140, over the communications link 126, 128, 130(*a-c*); sending a request (request A, request B) for remote management data (aggregate file A, aggregate file B) to each of the particular target computers 132, 136 over the communications link 126, 128, 130(*a-c*); in response to the request (request A, request B), receiving remote management data (aggregate file A, aggregate file B) from each of the particular target computers 132, 136 over the communications link 126, 128, 130(*a-c*); and based on the received remote management data (aggregate file A, aggregate file B), causing the display means 112 to simultaneously display at least one visual representation (312, 314, 316 in FIG. 3A; 322, 324, 326, 328 in FIG. 3B) of the graphical user console for each one of the particular target computers 132, 136 on a common graphical interface (310 in FIG. 3A; 320 in FIG. 3B).

In one embodiment, the at least one visual representation (312, 314, 316 in FIG. 3A; 322, 324, 326, 328 in FIG. 3B) of the graphical user console for each of the particular target computers 132, 136 includes an interactive display window (312, 314 in FIG. 3A; 322, 326 in FIG. 3B) of the graphical user console for each of the particular target computers 132, 136 that is generated based on KVM redirection (via server redirection applications (A-C) 134, 138, 142) from the corresponding particular target computer 132, 136 to the remote management computer 110.

In one embodiment, the functions of receiving user authentication data (step 507) and causing the display means 112 to simultaneously display the visual representations (312, 314, 316 in FIG. 3A; 322, 324, 326, 328 in FIG. 3B) (steps 509, 511) are performed via a web-based application 120, 122, 124 executing on the remote management computer 110.

In one embodiment, the remote management data (aggregate file A, aggregate file B) for each of the particular target computers 132, 136 includes computer-executable instructions which, when executed by one or more processors (see, for example, CPU 422), provide at least one remote management functionality to the remote management computer 110 for remotely managing at least one operation of the corresponding particular target computer 132, 136. The remote management data (aggregate file A, aggregate file B), as received, is provided within a single aggregate file.

In one embodiment, the aggregate file, as received, is configured as a Java Archive (JAR) file.

In one embodiment, the function of receiving the remote management data (aggregate file A, aggregate file B) includes downloading the aggregate file from the corresponding particular target computer 132, 136 over the communications link 126, 128, 130(a-c). The function of causing the display means 112 of the remote management computer 110 to simultaneously display at least one visual representation (312, 314, 316 in FIG. 3A; 322, 324, 326, 328 in FIG. 3B) of the graphical user console for each one of the particular target computers 132, 136 on a common display screen (310 in FIG. 3A; 320 in FIG. 3B) includes invoking the downloaded aggregate file corresponding to each one of the particular target computers 132, 136.

In another aspect, the present invention relates to a computer-implementable method. In one embodiment, the method includes the steps of: (step 503) receiving, from a user 102 of a remote management computer 110, user authentication data including login information configured for permitting the user 102 to remotely access particular target computers 132, 136 over a communications link 126, 128, 130(a-c); (step 505) sending a request (request A, request B) for remote management data (aggregate file A, aggregate file B) to each of the plurality of particular target computers 132, 136 over the communications link 126, 128, 130(a-c); (step 507) in response to the request (request A, request B), receiving remote management data (aggregate file A, aggregate file B) from each of the particular target computers 132, 136 over the communications link 126, 128, 130(a-c); and (steps 509, 511) based on the received remote management data (aggregate file A, aggregate file B), causing a display means 112 of the remote management computer 110 to simultaneously display at least one visual representation (312, 314, 316 in FIG. 3A; 322, 324, 326, 328 in FIG. 3B) of the graphical user console for each one of the particular target computers 132, 136 in a common graphical interface (310 in FIG. 3A; 320 in FIG. 3B).

In one embodiment, the at least one visual representation (312, 314, 316 in FIG. 3A; 322, 324, 326, 328 in FIG. 3B) of the graphical user console for each of the particular target computers 132, 136 includes an interactive display window (312, 314 in FIG. 3A; 322, 326 in FIG. 3B). The at least one visual representation (312, 314, 316 in FIG. 3A; 322, 324, 326, 328 in FIG. 3B) of the graphical user console for each of the particular target computers 132, 136 is generated based on KVM redirection (via server redirection applications (A-C) 134, 138, 142) from the corresponding particular target computer 132, 136 to the remote management computer 110.

In one embodiment, the steps of receiving user authentication data (step 507) and causing the display means 112 to simultaneously display the visual representations (312, 314, 316 in FIG. 3A; 322, 324, 326, 328 in FIG. 3B) (steps 509, 511) are performed via a web-based application 120, 122, 124 executing on the remote management computer 110.

In one embodiment, the remote management data (aggregate file A, aggregate file B) for each of the particular target computers 132, 136 includes computer-executable instructions which, when executed by one or more processors (see, for example, CPU 422), provide at least one remote management functionality to the remote management computer 110 for remotely managing at least one operation of the corresponding particular target computer 132, 136.

In one embodiment, the remote management data (aggregate file A, aggregate file B), as received, is provided within a single aggregate file configured as a Java Archive (JAR) file.

In one embodiment, the step of receiving the remote management data (aggregate file A, aggregate file B) includes downloading the aggregate file from the corresponding particular target computer 132, 136 over the communications link 126, 128, 130(a-c). The step of causing the display means 112 of the remote management computer 110 to simultaneously display at least one visual representation (312, 314, 316 in FIG. 3A; 322, 324, 326, 328 in FIG. 3B) of the graphical user console for each one of the particular target computers 132, 136 on a common graphical interface (310 in FIG. 3A; 320 in FIG. 3B) (steps 509, 511) includes invoking the downloaded aggregate file corresponding to each one of the particular target computers 132, 136.

In yet another aspect, the present invention relates to a computer-readable medium having stored instructions which, when executed by one or more processors (see, for example, CPU 422), cause a computer system to perform specific functions. In one embodiment, the specific functions include: (step 503) receiving user authentication data including login information configured for permitting a user 102 of a remote management computer 110 to remotely access particular target computers 132, 136 over a communications link 126, 128, 130(a-c); (step 505) sending a request (request A, request B) for remote management data (aggregate file A, aggregate file B) to each of the particular target computers 132, 136 over the communications link 126, 128, 130(a-c); (step 507) in response to the request (request A, request B), receiving remote management data (aggregate file A, aggregate file B) from each of the particular target computers 132, 136 over the communications link 126, 128, 130(a-c); and (steps 509, 511) based on the received remote management data (aggregate file A, aggregate file B), causing a display means 112 of the remote management computer 110 to simultaneously display at least one visual representation (312, 314, 316 in FIG. 3A; 322, 324, 326, 328 in FIG. 3B) of the graphical user console for each one of the particular target computers 132, 136 in a common graphical interface (310 in FIG. 3A; 320 in FIG. 3B).

In one embodiment, the at least one visual representation (312, 314, 316 in FIG. 3A; 322, 324, 326, 328 in FIG. 3B) of the graphical user console for each of the particular target computers 132, 136 includes an interactive display window (312, 314 in FIG. 3A; 322, 326 in FIG. 3B). The at least one visual representation (312, 314, 316 in FIG. 3A; 322, 324, 326, 328 in FIG. 3B) of the graphical user console for each of the particular target computers 132, 136 is generated based on KVM redirection (via server redirection applications (A-C) 134, 138, 142) from the corresponding particular target computer 132, 136 to the remote management computer 110.

In one embodiment, the functions of receiving user authentication data (step 503) and causing the display means 112 to simultaneously display the visual representations (312, 314, 316 in FIG. 3A; 322, 324, 326, 328 in FIG. 3B) (steps 509, 511) are performed via a web-based application 120, 122, 124 executing on the remote management computer 110.

In one embodiment, the remote management data (aggregate file A, aggregate file B) for each of the particular target computers 132, 136 includes computer-executable instructions which, when executed by one or more processors (see, for example, CPU 422), provide at least one remote management functionality to the remote management computer 110 for remotely managing at least one operation of the corresponding particular target computer 132, 136.

In one embodiment, the remote management data (aggregate file A, aggregate file B), as received, is provided within a single aggregate file.

In one embodiment, the aggregate file, as received, is configured as a Java Archive (JAR) file.

In one embodiment, the function of receiving the remote management data (aggregate file A, aggregate file B) includes downloading the aggregate file from the corresponding particular target computer 132, 136 over the communications link 126, 128, 130(a-c).

In one embodiment, the function of causing the display means 112 of the remote management computer 110 to simultaneously display at least one visual representation (312, 314, 316 in FIG. 3A; 322, 324, 326, 328 in FIG. 3B) (steps 509, 511) of the graphical user console for each one of the particular target computers 132, 136 on a common display screen (310 in FIG. 3A; 320 in FIG. 3B) includes invoking the downloaded aggregate file corresponding to each one of the particular target computers 132, 136.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A computer system, comprising:
   (a) a remote management computer having a display means;
   (b) a first target computer and a second target computer communicatively coupled to the remote management computer over a communications link, wherein the first and second target computers include first and second baseboard management controllers (BMCs), respectively, each configured to execute a server redirection application and store remote management data, wherein the first and second BMCs are configured to provide at least one management functionality to the first and second target computers, respectively, wherein the server redirection application is configured to provide a keyboard, video and mouse (KVM) redirection function; and
   (c) a computer-executable remote management application executed on the remote management computer and configured to, when executed by one or more processors, cause the remote management computer to perform functions that include:
      (i) obtaining and maintaining an Intelligent Platform Management Interface (IPMI) credential configured for permitting a user of the remote management computer to remotely access both the first and second BMCs over the communications link;
      (ii) sending first and second requests for first and second Java Archive (JAR) files each containing remote management data to the first and second BMCs over the communications link, respectively;
      (iii) receiving an authentication request from each of the first and second BMCs, and, in response to the authentication request, sending the maintained IPMI credential to each of the first and second BMCs to obtain a KVM direction session;
      (iv) receiving first and second JAR files from the first and second BMCs over the communications link, respectively; and
      (v) invoking the first and second JAR files to establish first and second KVM sessions with the first and second BMCs, respectively, and simultaneously displaying, in a common graphical interface, first and second KVM consoles that present a KVM redirection representation received respectively from the server redirection applications of the first and second BMCs.

2. The computer system of claim 1, wherein each of the first KVM console and the second KVM console comprises an interactive display window.

3. The computer system of claim 1, wherein the functions of obtaining the IPMI credential and simultaneously displaying the first KVM console and the second KVM console are performed via a web-based application executing on the remote management computer.

4. The computer system of claim 1, wherein the function of receiving the first and second JAR files comprises downloading the first and second JAR files from the first and second BMCs over the communications link, respectively.

5. A computer-implementable method, comprising the steps of:
   obtaining and maintaining, at a remote management computer, an Intelligent Platform Management Interface (IPMI) credential configured for permitting a user of the remote management computer to remotely access first and second target computers over a communications link;
   sending first and second requests for first and second Java Archive (JAR) files each containing remote management data to first and second target computers over the communications link, respectively;
   receiving an authentication request from each of the first and second target computers, and, in response to the authentication request, sending the maintained IPMI credential to each of the first and second target computers to obtain a respective keyboard, video and mouse (KVM) direction session;

receiving the first and second JAR files from first and second target computers over the communications link, respectively; and invoking the first and second JAR files to establish first and second KVM sessions with the first and second target computers, respectively, and simultaneously displaying, in a common graphical interface, first and second KVM consoles that present a KVM redirection representation received respectively from server redirection applications of the first and second target computers.

6. The method of claim 5, wherein each of the first KVM console and the second KVM console comprises an interactive display window.

7. The method of claim 5, wherein the steps of obtaining the IPMI credential simultaneously displaying the first KVM console and the second KVM console are performed via a web-based application executing on the remote management computer.

8. The method of claim 5, wherein the step of receiving the first and second JAR file comprises downloading the first and second JAR files from the first and second target computers over the communications link, respectively.

9. Non-transitory computer-readable media having stored thereon a first set of instructions and a second set of instructions, wherein:

the first set of instructions is configured to, when executed at each of first and second baseboard management controllers (BMCs) of, respectively, first and second target computers, cause the each BMC to provide at least one management functionality to the respective one of the first and second target computers, and execute a server redirection application that is configured to provide a keyboard, video and mouse (KVM) redirection function;

the second set of instructions is configured to, when executed by one or more processors of a remote management computer, cause the remote management computer to perform functions that comprise:

obtaining and maintaining an Intelligent Platform Management Interface (IPMI) credential configured for permitting a user of the remote management computer to remotely access both the first and second BMCs over a communications link;

sending first and second requests for first and second Java Archive (JAR) files each containing remote management data to the first and second BMCs over the communications link, respectively;

receiving an authentication request from each of the first and second BMCs, and, in response to the authentication request, sending the maintained IPMI credential to each of the first and second BMCs to obtain a KVM direction session;

receiving first and second JAR files from the first and second BMCs over the communications link, respectively; and invoking the first and second JAR files to establish first and second KVM sessions with the first and second BMCs, respectively, and simultaneously displaying, in a common graphical interface, first and second KVM consoles that resent a KVM redirection redirection representation received respectively from the server redirection applications of the first and second target computers.

10. The non-transitory computer-readable media of claim 9, wherein each of the first KVM console and the second KVM console comprises an interactive display window.

11. The non-transitory computer-readable media of claim 9, wherein the functions of obtaining the IPMI credential simultaneously displaying the first KVM console and the second KVM console are performed via a web-based application executing on the remote management computer.

12. The non-transitory computer-readable media of claim 9, wherein the function of receiving the first and second JAR files comprises downloading the first and second JAR files from the first and second BMCs over the communications link, respectively.

* * * * *